DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 16, 1969

869 O.G. 711

T869,001
POLYOLEFIN STRAPPING

Paul K. Fain, Jr., % Tennessee Eastman Co., P.O. Box 511, Kingsport, Tenn. 37662

Continuation-in-part of application Ser. No. 643,376, June 5, 1967. This application Aug. 31, 1967, Ser. No. 664,823

Int. Cl. B32b *3/00*
U.S. Cl. 161—118
1 Sheet Drawing. 16 Pages Specification

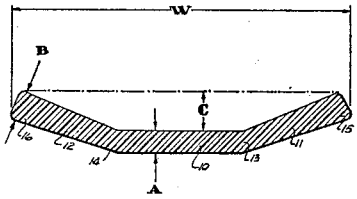

Improved polyolefin strapping having a bowed cross-sectional configuration comprising a center section with end sections extending outwardly from each side progressively increasing in thicknesses to an edge thickness greater than that of the center.

An improved method for manufacturing strapping from polyolefins including the steps of (1) extruding a polyolefin into sheet form, (2) subjecting the sheet to a controlled temperature between about 35° F. to about 200° F., (3) slitting the sheet into a plurality of straps while maintaining the controlled temperature, (4) orienting the strapping by drafting at an elevated temperature, and (5) heat setting the oriented strapping by exposing it to an intermediate temperature.

Dec. 16, 1969
P. K. FAIN, JR
T 869,001
POLYOLEFIN STRAPPING
Filed Aug. 31, 1967
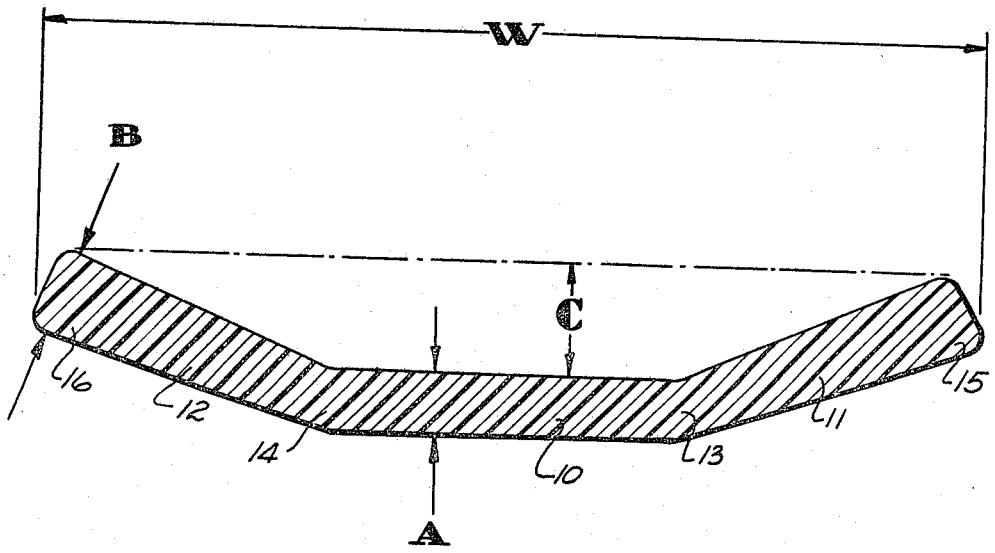
PAUL K. FAIN, JR.
INVENTOR.
BY William T. French
George P. Chandler
ATTORNEYS